No. 697,440. Patented Apr. 15, 1902.
C. C. BROOKS.
SHEARS.
(Application filed July 16, 1900.)
(No Model.)

Witnesses

Inventor
Chapin C. Brooks

UNITED STATES PATENT OFFICE.

CHAPIN C. BROOKS, OF HALLOWELL, MAINE.

SHEARS.

SPECIFICATION forming part of Letters Patent No. 697,440, dated April 15, 1902.

Application filed July 16, 1900. Serial No. 23,776. (No model.)

*To all whom it may concern:*

Be it known that I, CHAPIN C. BROOKS, a citizen of the United States, residing at Hallowell, in the county of Kennebec and State of Maine, have invented certain new and useful Improvements in Shears; and I do hereby declare that the following is a full, clear, and exact description of the invention, which will enable others skilled in the art to which it appertains to make and use the same.

My improvement relates to shears used for shearing sheep, trimming lawns, and other purposes, wherein the blades of the shears are normally kept apart by a spring and brought together by pressure of the hand, which is released with each clip or cut.

My improvement consists in the method of connecting blades whereby the operation of the shears is more convenient and whereby the pressure of the blades against each other may be regulated.

Figure 1:
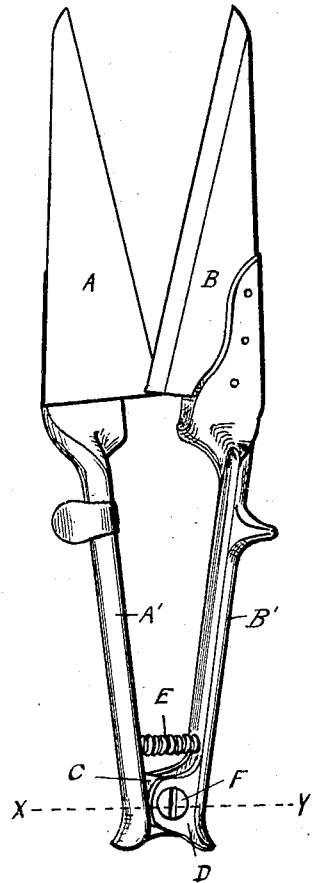
Figure 2:
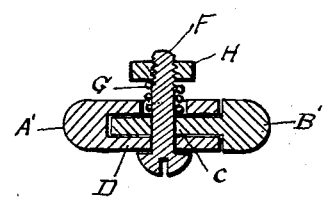

In the drawings, Figure 1 is a perspective view of the shears, and Fig. 2 a vertical section through the line $x\ y$ of Fig. 1.

The blades A and B are of the ordinary construction and are each provided with handles A' and B', respectively. Of course the blade and handle may be made in one piece. The handle A' upon the same side on which is the cutting edge of the shears is provided at the end with a lip C, while the handle B' is provided with ears D. The interval or space between these ears D is slightly greater than the thickness of the lip C. The handles A' and B' are connected together by inserting the lip C between the ears D and inserting through them a bolt F, proper apertures through the ears and lip being made for the reception of the bolt, the aperture or opening through the undermost ear being somewhat larger in diameter than that through the lip C and the other ear D. Within this aperture, in the undermost ear and around the bolt F, is placed a coil-spring G. (See Fig. 2.) The end of the bolt is secured by means of the nut H. In front of the bolt F there is placed between the handles A' and B' and there secured the coil-spring E. I do not, however, confine myself to a coil-spring; but there may be substituted for it a flat spring or any other of the well-known forms of springs.

The operation of these shears and their advantages are readily perceived. They open by the force of the spring and are closed by the pressure of the hand; but the joint being at one point and not spread over almost an entire circle the result is a precision in the action of the blades which cannot be obtained with the old form. The proximity of the blades one upon the other may be regulated by means of the nut H upon the bolt F by screwing down the nut against the spring G. The handle A' is pressed against the upper ear of the handle B' and the blade A carried correspondingly near to the blade B. By reversing the operation or unscrewing the nut H the blades A and B are separated as may be desired.

What I claim is—

In combination with shear-blades provided with handles, one having a lip and the other having two ears to receive said lip, openings through said ears and lip, a bolt adapted to pass through said openings together with a coil-spring surrounding the lower end of said bolt and a nut upon said bolt, substantially as described.

In testimony that I claim the foregoing as my invention I have hereunto set my hand this 13th day of July, A. D. 1900.

CHAPIN C. BROOKS.

In presence of—
GEO. E. BIRD,
ERNEST G. KNIGHTS.